(12) United States Patent
Curet et al.

(10) Patent No.: US 7,577,170 B2
(45) Date of Patent: Aug. 18, 2009

(54) SYSTEM FOR THE DYNAMIC MULTIPLEXING OF DIGITAL STREAMS

(75) Inventors: Dominique Curet, Thorigne-Fouillard (FR); Stephanie Relier, Domloup (FR); Catherine Roux, Rennes (FR); Antoine Maisonneuve, Rennes (FR)

(73) Assignee: France Telecom, Paris (FR)

( * ) Notice: Subject to any disclaimer, the term of this patent is extended or adjusted under 35 U.S.C. 154(b) by 570 days.

(21) Appl. No.: 10/513,365

(22) PCT Filed: Apr. 30, 2003

(86) PCT No.: PCT/FR03/01370

§ 371 (c)(1),
(2), (4) Date: Jul. 11, 2005

(87) PCT Pub. No.: WO03/094531

PCT Pub. Date: Nov. 13, 2003

(65) Prior Publication Data

US 2006/0232706 A1 Oct. 19, 2006

(30) Foreign Application Priority Data

May 3, 2002 (FR) .................................. 02 05605

(51) Int. Cl.
*H04J 3/04* (2006.01)
(52) U.S. Cl. ..................... 370/535; 348/423.1; 348/474
(58) Field of Classification Search .................... 370/35
See application file for complete search history.

(56) References Cited

U.S. PATENT DOCUMENTS

| | | | | |
|---|---|---|---|---|
| 6,072,771 A | * | 6/2000 | Anderson et al. | 370/216 |
| 6,175,577 B1 | * | 1/2001 | Van Den Heuvel | 370/537 |
| 6,205,140 B1 | | 3/2001 | Putzolu et al. | 370/389 |
| 7,113,523 B1 | * | 9/2006 | Kubota et al. | 370/535 |

FOREIGN PATENT DOCUMENTS

| | | |
|---|---|---|
| FR | 2797548 | 1/2000 |
| WO | WO 98/38765 | 9/1998 |

OTHER PUBLICATIONS

J. Van der Meer et al., "RTP Payload Format for MPEG-4 FlexMultiplexed Streams draft-curet-avt-rtp-mpeg4-flexmus-00. txt," XP-001033581, Internet Engineering Task Force Internet-Draft, Feb. 2001, pp. 1-13.
J. Van der Meer et al., "IETF/AVT Meeting," XP-002227892, Internet: URL:www.east.isi.edu/DIV7/IETF/AVT/52/slides/03-roux.ppt, Dec. 10, 2001, pp. 1-19.
S. Hartwig et al., "Broadcasting and Processing of Program Guides for Digital TV," XP 000668926, SMPT Journal, SMPTE Inc., Scarsdale, N.Y., US, vol. 106, No. 10, pp. 727-732.
C. Herpel, "MPEG-4 Systems: Elementary Stream Management," XP-000885367, Signal Processing, Image Communication, Elsevier Science Publishers, Amsterdam, Jan. 2000, pp. 299-320.

* cited by examiner

*Primary Examiner*—Chirag G Shah
*Assistant Examiner*—Otis L Thompson, Jr.
(74) *Attorney, Agent, or Firm*—Westman, Champlin & Kelly, P.A.

(57) ABSTRACT

A method and apparatus are provided for the dynamic multiplexing of digital streams which are transmitted in the form of stream units in one channel, each of said stream units bearing a stream identifier which can be used to associate same with the corresponding digital stream. The allocation of an identifier to a digital stream is defined by an allocation table and can vary over time, in such a way as to enable dynamic multiplexing. The aforementioned allocation table bears a version number and, in order to indicate that a change in the version of the allocation table applies to a given digital stream, a burst is transmitted with at least one version change stream unit comprising the current identifier of said digital stream, an indicator which can be used to determine if the stream unit is a version change stream unit and the version number becoming applicable to said digital stream.

21 Claims, 3 Drawing Sheets

SYSTEM FOR THE DYNAMIC MULTIPLEXING OF DIGITAL STREAMS

CROSS-REFERENCE TO RELATED APPLICATION

This Application is a Section 371 National Stage Application of International Application No. PCT/FR03/01370, filed Apr. 30, 2003 and published as WO 03/094531 on Nov. 13, 2003, not in English, which is based on French application No. FR 02/05605, filed May 3, 2002.

The field of the invention is that of the transmission and broadcast of digital streams, in particular for multimedia applications.

More specifically, the invention relates to a method for the dynamic multiplexing of digital streams, as well the corresponding signal, multiplexing device and receiver.

The invention, in particular, can be applied to the field of broadcasting of MPEG2 (Motion Picture Coding Experts Group,) MPEG4, DVB (Digital Video Broadcast,) etc. type multimedia data.

BACKGROUND OF THE INVENTION

Today it is a frequent occurrence, in particular in view of obtaining savings in terms of bandwidth, to multiplex different digital streams within the same signal.

Such multiplexing can be predetermined and its structure is therefore constant over time.

Multiplexing can also be dynamic; that is, that the structure of the multiplexed signal changes over time. In this case, a configuration table, which is part of the multiplex signalling, is generally defined. It can be transmitted by the same transmission channel as the multiplex (called "in-band" signalling) or any other means, for example, by a specific channel, called a signalling channel, which is distinct from the data channel through which the desired digital streams are transported (called "out-of-band" signalling.)

Thus, within the framework of the MPEG4 standard, a configuration table (or allocation table) called FlexMux-ChannelTable indicates to which digital stream a specific stream unit is associated, based on its index. Such an index, written in a specific field of the stream unit, is encoded over 256 bits. For example, for a given configuration table, index 112 can correspond to an audio stream, and index 118 to a video stream.

When a stream unit is received, the receiver queries the FlexMuxChannelTable configuration table and determines, according to the stream unit index, the processing that will be applied to it: in the previous example, the FlexMuxChannelTable table indicates to the receiver that the stream unit of index 118 must be transmitted to a video decoder.

Within the framework of applications that operate in "multicast" mode, such an allocation table is sent periodically (for example, once per second within the framework of Internet type applications,) so that it can be quickly available for a user that has just connected.

In the framework of dynamic multiplexing, a new allocation table is sent whenever a change takes place in the multiplex configuration. The receiver uses at each instance the last configuration table received to determine the processing to apply to a specific stream unit.

Nevertheless, this method has the inconvenience of not being very robust. Indeed, if loss or an error occurs during the allocation table transmission, the processing performed by the receiver is incorrect. Using again the example given above within the framework of MPEG4, the receiver can thus switch the stream unit of index 118 to a video decoder, whilst the new configuration table, which it has not received due to a network disturbance, shows that index 188, corresponds to a scene description.

Such losses or deterioration of bursts is frequent, in particular within the framework of network transmissions, which are subject to disturbances.

SUMMARY OF THE INVENTION

The aim of the invention is especially to overcome these inconveniences of the prior art.

More specifically, a purpose of the invention is to provide a robust technique of dynamic multiplexing of digital streams that is resistant to possible disturbances in the transmission environment.

Another purpose of the invention is to implement such a technique so that it is accurate in terms of configuration changes and cost-effective in terms of pass band (or bandwidth).

Another purpose of the invention is to provide a technique that allows independence from the various multiplexed streams with respect to the instant the configuration is changed.

These purposes, as well as others that will be described below, are obtained with the help of a dynamic multiplexing method of digital streams transmitted in the form of stream units in a single channel. Each of these stream units carries a stream identifier that allows associating it to the corresponding digital stream, the allocation of an identifier to a digital stream being defined by an allocation table and being able to vary over time to allow dynamic multiplexing.

According to the invention, this allocation table bears a version number and, to indicate a change in the version of said allocation table applies to a given digital stream, a burst is sent with at least one version change stream unit that includes:
  the current identifier of said digital stream;
  an indicator that allows determining that the stream unit is a version change stream unit;
  the version number that becomes applicable for said digital stream.

Thus, the invention is based on an approach that is completely new and inventive for the dynamic multiplexing of digital streams. Indeed, the invention is based on the introduction, on the one hand, of a version number of the configuration table, and on the other, of fictitious content elements, called version change stream units, which carry the version number of the multiplex configuration table. These fictitious content elements also bear the current identifier of the digital stream, and enable the various multiplexed streams to change configuration independently from each other. Furthermore, these version change stream units are only used during the transition phases of the change in configuration, so that the method of the invention is not a large consumer in terms of pass band (or bandwidth).

Preferably, said burst includes at least two consecutive version change stream units.

Thus, the risks inherent to the loss or deterioration of the version change stream unit are reduced, which makes the dynamic multiplexing method of the invention more robust.

Advantageously, said burst includes a sufficient number of consecutive version change stream units to cover a predetermined disturbance window during which it is possible that no stream units are received correctly.

Thus, the problem of packet (or burst) loss or deterioration in case of disturbances in the network or in the transmission channel is alleviated, and it is ensured that in the case of a change in configuration, the receiver is always aware of the version number of the allocation table to be used. Indeed, at least one version change stream unit is received before the beginning of the disturbance window and/or after the end of this window.

In an advantageous embodiment of the invention, said disturbance window is included between 0.2 and 1 sec.

More generally, the duration of the disturbance window depends on the network characteristics, and the length of the burst is therefore fixed.

Preferably, said indicator is a field that specifies the length of the desired section of the stream unit (or utilised section). This value, by definition, equals zero when a version change stream unit is involved.

The version change stream unit therefore has the same structure as a stream unit that can be qualified as a desired or informative stream unit, but it can be easily detected by the receiver, through the indication in the corresponding field, that such a stream unit has a null length. A "real" content element cannot have a null length, so the receiver directly deduces that the content element is a fictitious content element, indicative of a version change of the configuration table.

According to an advantageous characteristic of the invention, in a version change stream unit, the version number is written in the utilised section of said stream unit.

Thus, the structure of informative stream units is used, and in particular, the field reserved for the utilised section of the content elements, to insert the version number of the allocation table that must be used for the digital stream in question: This way, the version change stream units have the same structure as the information stream units and can be transported within the multiplex, in the same channel.

Preferably, at least in a transition phase after the transmission of said burst, at least one other version change stream unit is transmitted.

Thus, a version change stream unit can be inserted between two informative stream units in order to indicate the version number of the configuration table that must be taken into account for the first not null length stream unit received after the version change stream unit.

According to a first advantageous variant, said allocation table is transmitted in said channel.

This is referred to as "in-band" transmission.

According to a second advantageous variant, said allocation table is transmitted by a distinct path of said channel.

This is referred to as "out-of-band" transmission.

Preferably, said allocation table is transmitted at least two times before becoming applicable for at least one of said streams.

Thus, there is an increased probability that the receiver will receive the new configuration table, before a version stream change unit indicates that it is applicable for at least one of the digital streams. This contributes to the robustness of the dynamic multiplexing method of the invention.

Advantageously, a version change is applied from the first stream unit of the stream in question received after said burst.

Preferably, said streams belong to a group that includes:
natural audiovisual signals;
synthetic audiovisual signals;
two-or three-dimensional scenes;
descriptive information of the data (often called metadata;)
access and permission protection data.

Advantageously, such a method is implemented in MPEG4 or MPEG2 type applications.

The invention also relates to a signal that dynamically multiplexes the digital streams transmitted in the form of stream units in one channel. Each of these stream units carries a stream identifier that allows associating it to the corresponding digital stream. The allocation of an identifier to a digital stream is defined by an allocation table and can vary over time, in order to allow dynamic multiplexing.

According to the invention, this allocation table carries a version number and, to indicate that a version change of said allocation table applies to a given digital stream, such a signal includes a burst with at least one version change stream unit that includes:
the current identifier of said digital stream;
an indicator that allows determining that the stream unit is a version change stream unit;
the version number that becomes applicable for said digital stream.

Preferably, said indicator is a field that indicates the length of the desired section (or utilised section) of the stream unit. This value, by definition, equals zero when a version change stream unit is involved.

Advantageously, said signal is transported over a data channel that allows transmitting desired stream units, distinct from a signalling channel that allows transmitting signalling data. Said version change stream unit has the same structure as that of said desired stream units and is transported by said data channel.

The version change stream unit therefore makes up a fictitious content element that has the same structure as a desired or informative stream unit, and is transmitted by the same channel as the latter, not by a distinct signalling channel. The fields reserved for the length and the desired section of the stream unit include, respectively, in the case of a version change stream unit, the null value (to indicate that a fictitious content stream unit is involved) and the version number of the allocation table applicable for the stream in question.

Preferably, such a signal is implemented by the dynamic multiplexing method describe above.

The invention also relates to a dynamic multiplexing device for digital streams transmitted in the form of stream units in one channel. Each of these stream units carries a stream identifier that allows associating it to the corresponding digital stream. The allocation of an identifier to a digital stream is defined by an allocation table and can vary over time in order to allow dynamic multiplexing.

According to the invention, said allocation table carries a version number and, to indicate that a version change of said allocation table applies to a given digital stream, a burst of at least one version change stream unit is transmitted. This burst includes:
the current identifier of said digital stream;
an indicator that allows determining that the stream unit is a version change stream unit;
the version number that becomes applicable for said digital stream.

Preferably, such a device implements the dynamic multiplexing method described above.

Advantageously, such a device feeds the transmission means:
over the Internet; and/or
over a DVB network.

The invention also relates to a receiver of a signal multiplexed according to the dynamic multiplexing method described above.

Advantageously, such a receiver includes means for detecting said burst, and means for activating the corresponding version change over the stream in question.

Other characteristics and advantages of the invention will become more evident upon reading the following description of a preferred embodiment, given by way of a simple illustrative and nonexhaustive example.

DETAILED DESCRIPTION OF THE PREFERRED EMBODIMENTS

The general principle of the invention is based on the introduction, on the one hand, of an allocation table version number and, on the other, fictitious content elements that indicate a version change, for a given digital stream.

Figure 1:
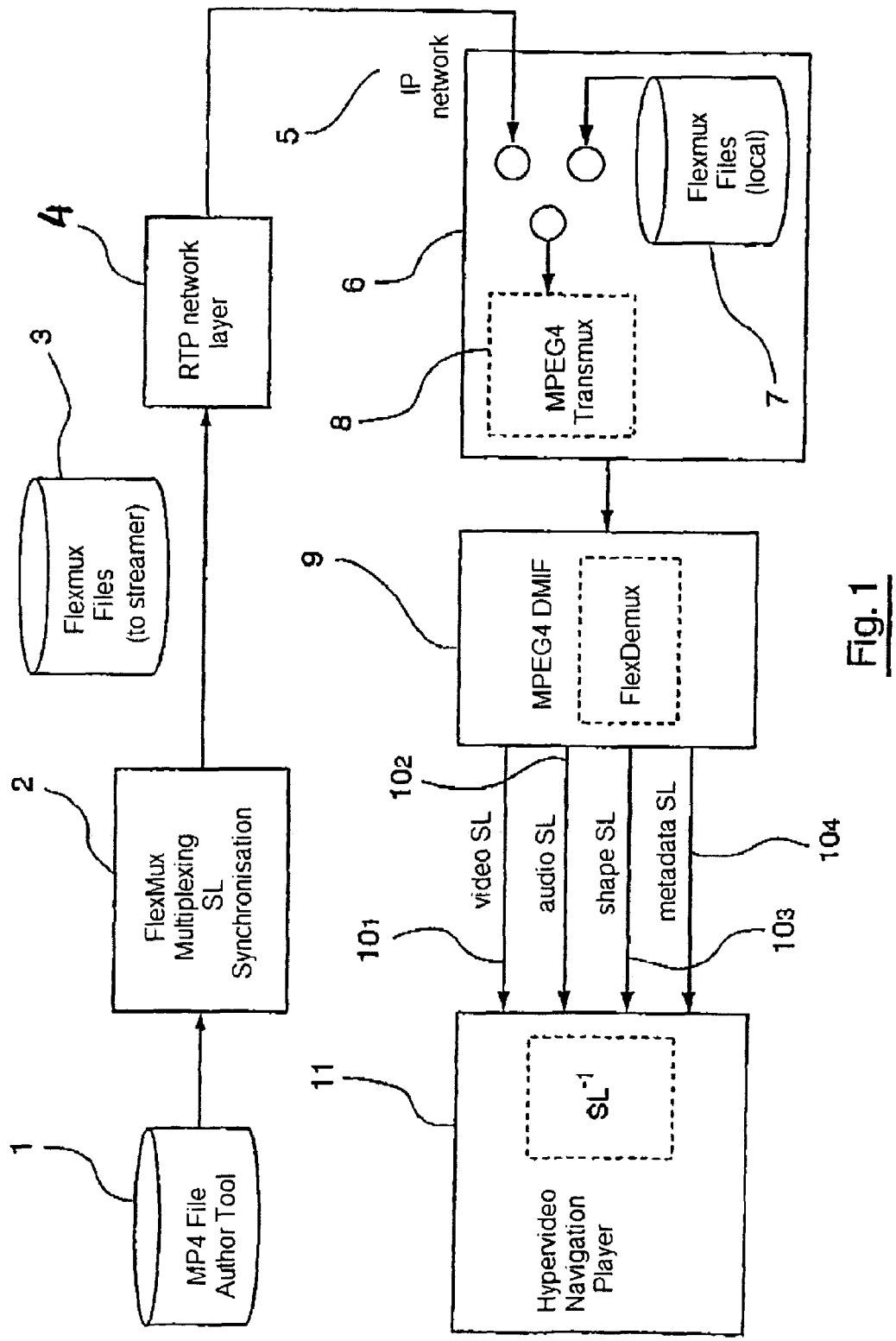
FIG. 1 illustrates a block diagram of an MPEG4 type application platform to which the dynamic multiplexing method of the invention can be advantageously applied.

Presented, in reference to FIG. 1, is an embodiment of the invention within the framework of an MPEG4 type application platform.

The architecture of such a platform is a classical architecture of the MPEG4 standard, and will therefore be described briefly below. For more information, the reader can refer to the MPEG-4 system standard (ISO/IEC 14496-1.)

Block 1 constitutes a database that stores a plurality of MPEG4 type files and allows generating a plurality of related digital streams, which the invention allows to dynamically multiplex.

During transmission, the invention is more specifically implemented in the block referenced as 2 for synchronising and multiplexing the various digital streams. Within the framework of the MPEG4 standard, this multiplexing block 2 uses a Flexmux multiplexing tool. The output of the FlexMux tool is done in real time towards block referenced as 4 or in deferred time towards block referenced as 3 for storage (the various corresponding FlexMux files are therefore stored in reference block 3.) Thus, the MPEG4 system layers are used to multiplex and synchronise the MPEG4 audio and video streams and, for example, MPEG7 data that describe the segmentation of objects in MPEG4 video, and that describe the links attached to the various segmented video objects.

The digital multiplex crosses an RTP (Real Time Transfer) network layer referenced as 4, then passes, via the IP (Internet Protocol) network 5, up to the block referenced as 6, where it is processed, with respect to the FlexMux files 7 stored locally, using the Transmux tool 8 of the MPEG4 standard, which ensures the comprehension of the RTP protocol for extracting MPEG-4 signals.

During reception, the invention is more specifically implemented in the block referenced as 9, where the multiplex received is demultiplexed in order to generate a plurality of audio, video, scene description or even metadata elementary streams $10_1$, $10_2$, $10_3$, $10_4$. These various digital streams are then processed by block 11, according to their nature and destination.

Figure 2:
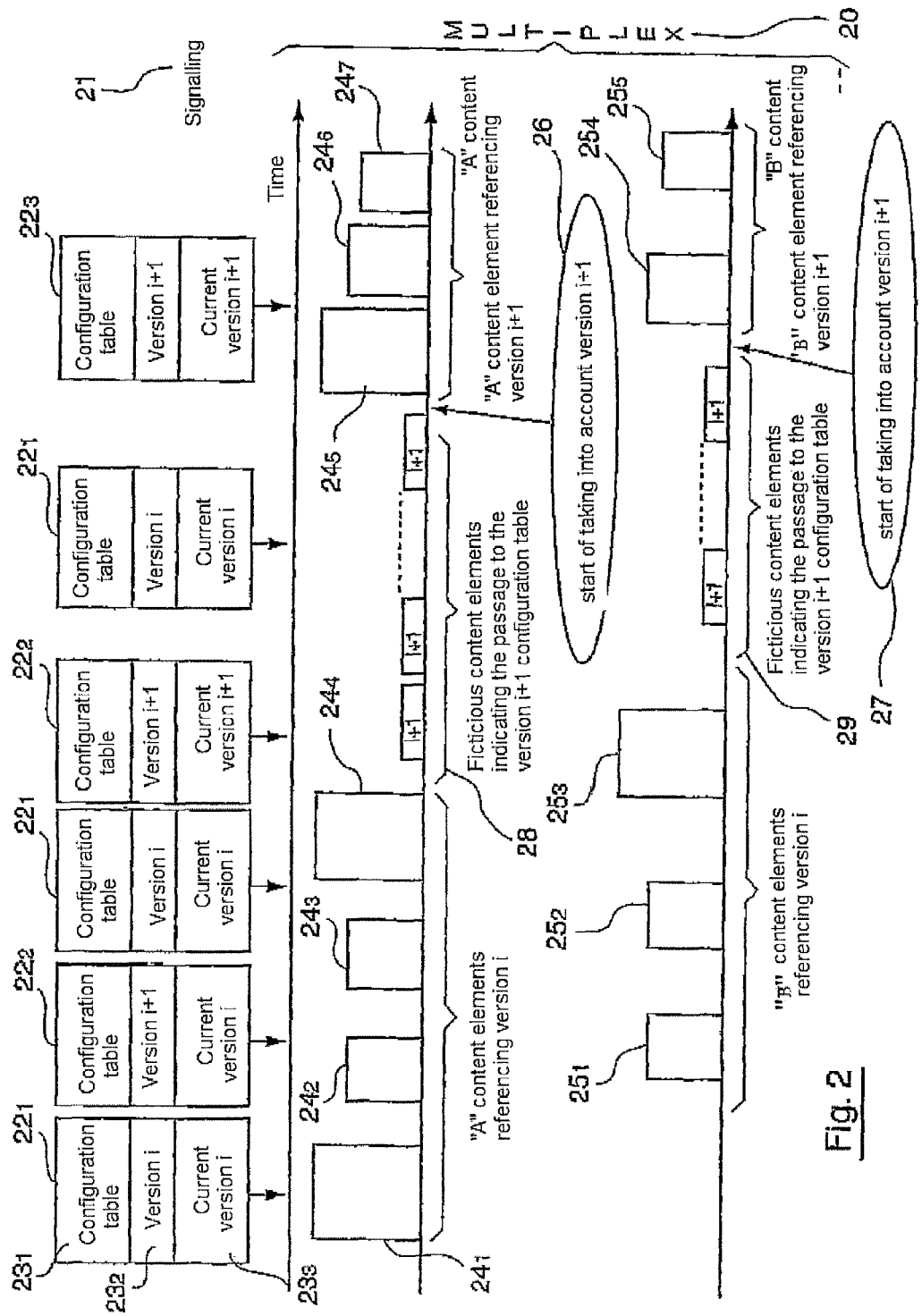
FIG. 2 illustrates the version change of an allocation table that can, for example, be implemented within the framework of the application platform in FIG. 1.

Presented now with respect to FIG. 2, is the structure of the multiplex implemented within the framework of the invention, which includes version change stream units that allow temporally independent changes of versions for various contents or digital streams.

For simplification, considered is a multiplex 20 of two digital streams respectively called content "A" and content "B." It will be easily understood that the multiplexes implemented within the framework of the invention generally include a number of digital streams that are greater than 2.

The signalling data 21 can be sent out-of-band or in-band. In particular, they include packets $22_1$ to $22_3$ transporting a configuration table (or allocation table) $23_1$, its version number $23_2$, as well as the version number $23_3$ of the current configuration table.

Multiplex 20 includes, for content "A" (respectively, for content "B",) a plurality of informative or desired stream units referenced as $24_1$ to $24_7$ (respectively $25_1$ to $25_5$.)

According to the invention, to indicate that the configuration table applicable for content "A" (respectively "B") will change (in the example in FIG. 2, passage of the allocation table of the version number i to the allocation table of version number i+1,) a burst 28 (respectively 29) is sent of fictitious content elements, or version change stream units. It can be noted that the fictitious content elements 28, 29 are represented on FIG. 2 by packets that are smaller than the informative stream units $24_1$ to $24_7$ and $25_1$ to $25_5$, which symbolises the fact that these fictitious content elements have a null length.

Bursts 28, 29 of the version change stream units indicate that the new allocation table applicable for content "A," "B" in question carries the version number i+1.

Thus, for content "A" (respectively "B,") the information stream units $24_1$ to $24_4$ (respectively $25_1$ to $25_3$) referred to version i of the configuration table. The receipt of burst 28 (respectively 29) of the fictitious content elements triggers, for content "A" (respectively "B") at the instant referenced as 26 (respectively 27,) when the version i+1 configuration table begins to take into account the content elements referenced as $24_5$ to $24_7$ (respectively $25_4$ to $25_5$) that will be subsequently received.

It can be noted that instants 26 and 27, in which the applicable configuration table changes, are distinct for contents "A" and "B." The invention thus, advantageously, allows obtaining independence from the multiplexed contents with respect to the instant of the change in configuration.

The version change of the applicable configuration table for a given content is taken into account when the first informative stream unit $24_5$, $25_4$ is received (that is, upon receipt of the first non-fictitious content element.)

It can also be noted that the version number i+1 configuration table 231 is sent at several occasions, before sending bursts 28 and 29 of the version change stream units. This way, the i+1 configuration table can be decoded before instant 26, 27 in which it becomes applicable. Moreover, the repeated sending of this table increases the probability that it will be correctly received at least once by the receiver, in the face of possible disturbances in the transmission network.

In an embodiment variation of the invention, not illustrated in FIG. 2, at least one fictitious content element is also inserted in the "A" and/or "B" content during the transition phase that follows the transmission of burst 28 and/or 29. For example, a version change stream unit is inserted between packets $24_5$ and $24_6$ to indicate a version change of the allocation table.

Chosen preferably is a burst 28, 29 duration greater than the duration of an error burst observed on the network used by multiplex 20. This way, the robustness of the multiplexing method of the invention is ensured by ensuring that the receiver has been correctly informed of the version change of the allocation table at instant 26, 27 where the new table becomes applicable in the face of possible network disturbances.

The multiplexing procedure of the invention described with respect to FIG. 2 has a number of advantages with respect to a more summarised dynamic multiplexing solution, in which it would be enough to associate a version number to the configuration table.

Indeed, the dynamic multiplexing method of the invention is more robust, more accurate and more flexible than a dynamic multiplexing method that only associates a version number to the configuration table and according to which a receiver would monitor the changes in the version number of the table, so that it only takes into account an allocation table if its version number is different from the previous table. Such a method would be, indeed, subject to possible losses or deterioration of the allocation table during its transmission. Moreover, the change in configuration will be forcibly performed at the same time for all the digital streams of the multiplex, which does not generally correspond to real needs.

The multiplexing procedure of the invention also has several advantages with respect to a dynamic multiplexing procedure that may consist in specifying, each time a configuration table and its related version number is sent, the version number of the current configuration table. It also presents several advantages with respect to such a procedure, which may be completed, during out-of-band signalling, by an insertion mechanism, in each content element or stream unit, of the version number of the multiplex configuration table.

Indeed, if each multiplexed content element carried a version number of the configuration table of the multiplex, the overload, in terms of size and therefore pass band congestion, caused by these version numbers, would be significant. The version number of the allocation table would be, indeed, present in each multiplexed stream unit, in particular during the long static phases where the multiplex configuration does not change, and during the change phases of the multiplex configuration, even when the stream unit in question is not affected by such a change.

Furthermore, in the case of in-band signalling, for which the version number must be written on each multiplexed content element would not be mandatory, the taking into account of the configuration change would necessarily occur at the same instant for all the multiplexed digital streams, which does not reflect the needs of the multimedia application types considered.

The dynamic multiplexing method of the invention, in contrast, allows multiplexed contents to change configuration, independent of each other, and not all together.

It does not have the inconvenience described above related to the overload in terms of size that results from the indication of the version number on the content elements. In contrast, it allows introducing version numbers at the stream unit level only during transition phases of a real configuration change, and that, only for the content elements whose configuration characteristics change.

Indeed, according to the dynamic multiplexing procedure of the invention, during the change transition phases of the allocation table, the version number of the new applicable configuration table is indicated by fictitious content elements, only for the contents multiplexed whose configuration characteristics change, and this, with the greatest accuracy possible.

Moreover, according to the invention, the version number of the configuration table is not indicated during the allocation stability phases for the various multiplexed stream units, whether their configuration characteristics have changed or not. Neither is it indicated during the change transition phases of the allocation table for the stream units of the multiplex whose configuration characteristics do not change.

Consequently, the invention allows, with respect to other more summarised dynamic multiplexing procedures that may be envisaged, a reduction of the overall throughput of the multiplex, an independence with respect to the instant of configuration change of the multiplexed flows, and the greatest accuracy possible.

Figure 3A:
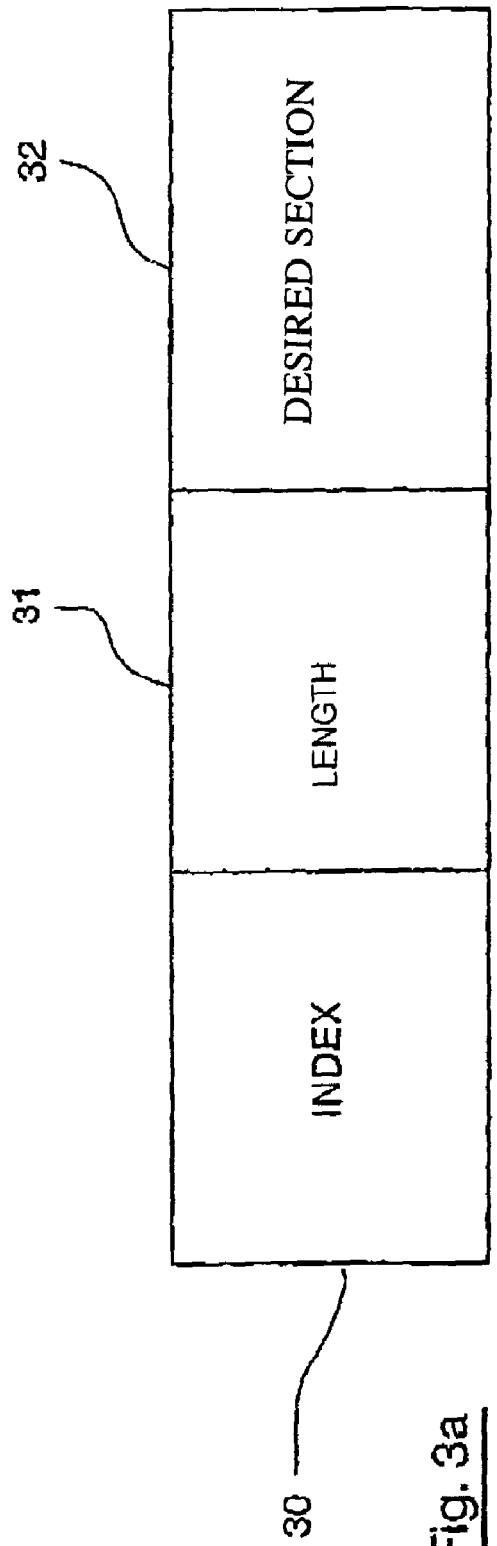
FIGS. 3a and 3b describe the compared structure of a desired or informative stream unit and a version change stream unit according to the invention.
Figure 3B:
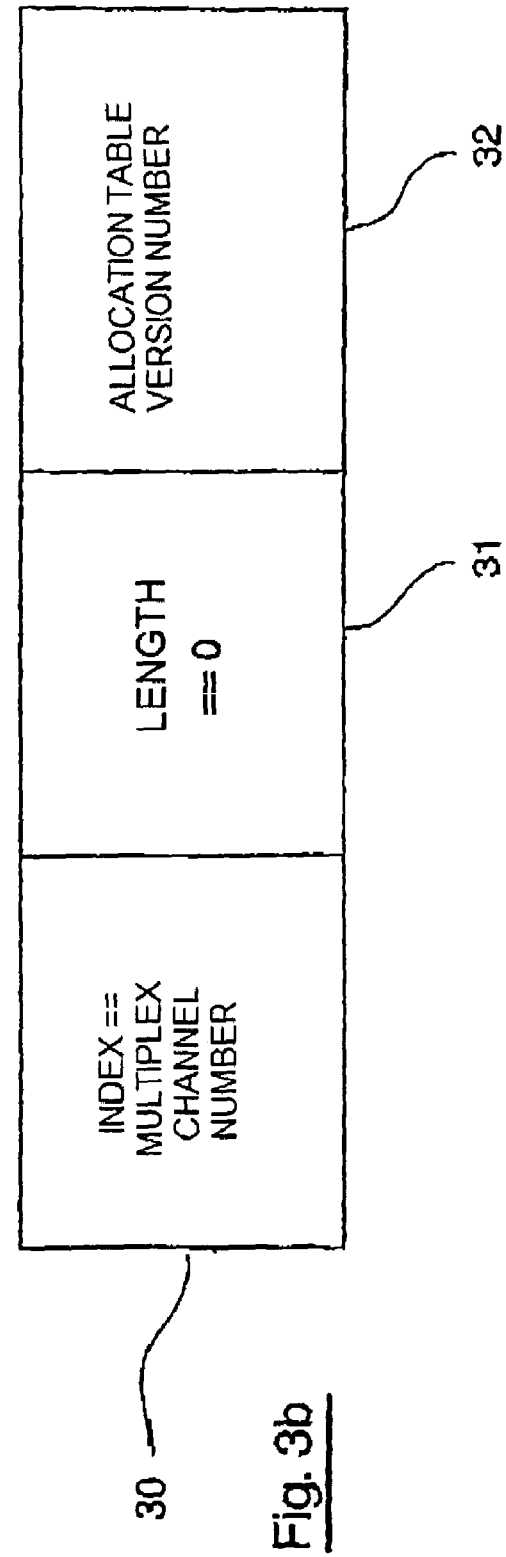

Now described, with respect to FIGS. 3a and 3b, is the structure of informative stream units and version change stream units implemented by the invention.

The fictitious content elements introduced by the invention have, advantageously, the same structure than that of real content elements, and are transmitted, using the same transmission channel, within the multiplex.

As an example, described below is the case of the stream units suggested by the MPEG4 standard.

Within the framework of the ISO/14496-1 (MPEG4 system) standard, and more specifically, in the case of the multiplex called FlexMux, a digital stream unit includes three fields referenced as 30 to 32 and respectively corresponding to:

an index 30, generally coded between 0 and 255, corresponding to the multiplex channel number and allowing to identify the digital stream in question;

length 31 of the packet;

desired section 32 of the content element.

The invention suggests introducing fictitious content elements, corresponding to FlexMux packets that do not transport data in their utilised section 32. Such packets are characterised by the presence of the null value in the length field referenced as 31, which makes them easily detectable by a receiver. They also transport another version number of the allocation table (or FMC table for FlexMuxChannelTable) applicable to the stream indicated by index 30 in their desired section 32.

The invention claimed is:

1. A method comprising:

dynamically multiplexing, with a dynamic multiplexing device, at least two digital streams transmitted in the form of stream units in one channel, each of these stream units bearing a stream identifier that allows associating it to the corresponding digital stream, the allocation of an identifier to a digital stream being defined by an allocation table and being able to vary over time, in order to allow dynamic multiplexing, said allocation table being identified by a version number, wherein, to indicate that a change of the version number of said allocation table is applicable to a given digital stream, a unique, respective burst is transmitted for that given digital stream with at least one version change stream unit that includes:

the stream identifier of said given digital stream;

an indicator that allows determining that the stream unit is a version change stream unit; and a new version number of the allocation table that becomes applicable for said given digital stream, wherein at least one of the digital streams is permitted to have a different version number than another of the digital streams that are multiplexed in the channel.

2. The dynamic multiplexing method according to claim 1, wherein said burst includes at least two consecutive version change stream units.

3. The dynamic multiplexing method according to claim 1, wherein said burst includes a sufficient number of consecutive version change stream units to cover a predetermined disturbance window during which it is possible that no stream units are received coffectly.

4. The dynamic multiplexing method according to claim 3, wherein said disturbance window is included between 0.2 and 1 sec.

5. The dynamic multiplexing method according to claim 1, wherein said indicator is a field that indicates the length of a desired section of the stream unit, said value, by definition, being equal to zero when a version change stream unit is involved.

6. The dynamic multiplexing method according to claim 1, wherein, in a version change stream unit, the version number is written in a desired section of said stream unit.

7. The dynamic multiplexing method according to claim 1, wherein in at least one transition phase following the transmission of said burst, at least one other version change stream unit is transmitted.

8. The dynamic multiplexing method according to claim 1, wherein said allocation table is transmitted in said channel.

9. The dynamic multiplexing method according to claim 1, wherein said allocation table is transmitted through a distinct path of said channel.

10. The dynamic multiplexing method according to claim 1, wherein said allocation table is transmitted at least two times before becoming applicable for at least one of said streams.

11. The dynamic multiplexing method according to claim 1, wherein a version change is applied from the first stream unit of the stream received after said burst.

12. The dynamic multiplexing method according to claim 1, wherein said streams belong to a group that includes:
natural audiovisual signals;
synthetic audiovisual signals;
two or three-dimensional scenes;
descriptive information of the data (often called metadata;)
access and permission protection data.

13. The dynamic multiplexing method according to claim 1, wherein the method is implemented in an MPEG4 or MPEG2 type application.

14. A method comprising the steps of:
dynamically multiplexing, with a dynamic multiplexing device, at least two digital streams to produce a signal transmitted in the form of stream units in one channel, each of said stream units bearing a stream identifier that allows associating it to the corresponding digital stream, the allocation of an identifier to a digital stream being defined by an allocation table and being able to vary over time in order to allow dynamic multiplexing, said allocation table being identified by a version number,
wherein, to indicate that a change of the version number of said allocation table applies to a given digital stream, the signal includes a respective burst for that given digital stream with at least one version change stream unit that includes:
the stream identifier of said given digital stream;
an indicator that allows determining that the stream unit is a version change stream unit;
a new version number of the allocation table that becomes applicable for said given digital stream,
wherein at least one of the digital streams is permitted to have a different version number than another of the digital streams that are multiplexed in the channel and transmitting the signal.

15. The method according to claim 14, wherein said indicator is a field specifying the length of the desired section of the stream unit, this value, by definition, being equals zero when a version change stream unit is involved.

16. The method according to claim 14, wherein said signal being transported over a data channel that allows transmitting desired stream units, distinct from the signalling channel that allows transmitting signalling data, said version change stream unit has the same structure as that of said desired stream units and is transported by said data channel.

17. The method according to claim 14, wherein the signal is implemented by the dynamic multiplexing method according to claim 1.

18. Dynamic multiplexing device comprising:
a multiplexer, which multiplexes, at least two digital streams transmitted in the form of stream units in one channel, each of said stream units bearing a stream identifier that allows associating it to the corresponding digital stream, the allocation of an identifier to a digital stream being defined by an allocation table and being able to vary over time in order to allow dynamic multiplexing, said allocation table being identified by a version number,
wherein, to indicate that a change of the version number of said allocation table is applicable to a given digital stream, the device further comprises a transmitter, which transmits a respective burst for that given digital stream with at least one version change stream unit that includes:
the stream identifier of said given digital stream;
an indicator that allows determining that the stream unit is a version change stream unit; and
a new version number of the allocation table that becomes applicable for said given digital stream,
wherein at least one of the digital streams is permitted to have a different version number than another of the digital streams that are multiplexed in the channel.

19. Dynamic multiplexing device according to claim 18, wherein the device transmits the digital streams over at least one of:
the Internet; or
a DVB network.

20. A receiver comprising:
means for receiving a signal dynamically multiplexing at least two digital streams transmitted in the form of stream units in one channel, each of said stream units bearing a stream identifier that allows associating it to the corresponding digital stream, the allocation of an identifier to a digital stream being defined by an allocation table and being able to vary over time in order to allow dynamic multiplexing, said allocation table being identified by a version number,
wherein, to indicate that a change of the version number of said allocation table applies to a given digital stream, the signal includes a respective burst for that given digital stream with at least one version change stream unit that includes:
the stream identifier of said given digital stream;
an indicator that allows determining that the stream unit is a version change stream unit; and
a new version number of the allocation table that becomes applicable for said given digital stream,
and wherein said receiver further comprises:
means for detecting said burst, and
means for activating the corresponding change of the version number of said allocation table applicable for said given digital stream, wherein at least one of the digital streams is permitted to have a different version number than another of the digital streams that are multiplexed in the channel.

21. A method comprising:
dynamically multiplexing, with a dynamic multiplexing device, digital streams transmitted in the form of stream units in one channel, each of these stream units bearing a stream identifier that allows associating it to the corresponding digital stream, the allocation of an identifier to a digital stream being defined by an allocation table and being able to vary over time, in order to allow dynamic multiplexing, said allocation table being identified by a version number, wherein, to indicate that a change of the version number of said allocation table is applicable to a given digital stream, a burst is transmitted with at least one version change stream unit that includes:

the stream identifier of said given digital stream;

an indicator that allows determining that the stream unit is a version change stream unit, wherein said indicator comprises a field having a value that indicates the length of a desired section of the stream unit, said value, by definition, being equal to zero when a version change stream unit is involved; and a new version number of the allocation table that becomes applicable for said given digital stream.

* * * * *